Figure 1:
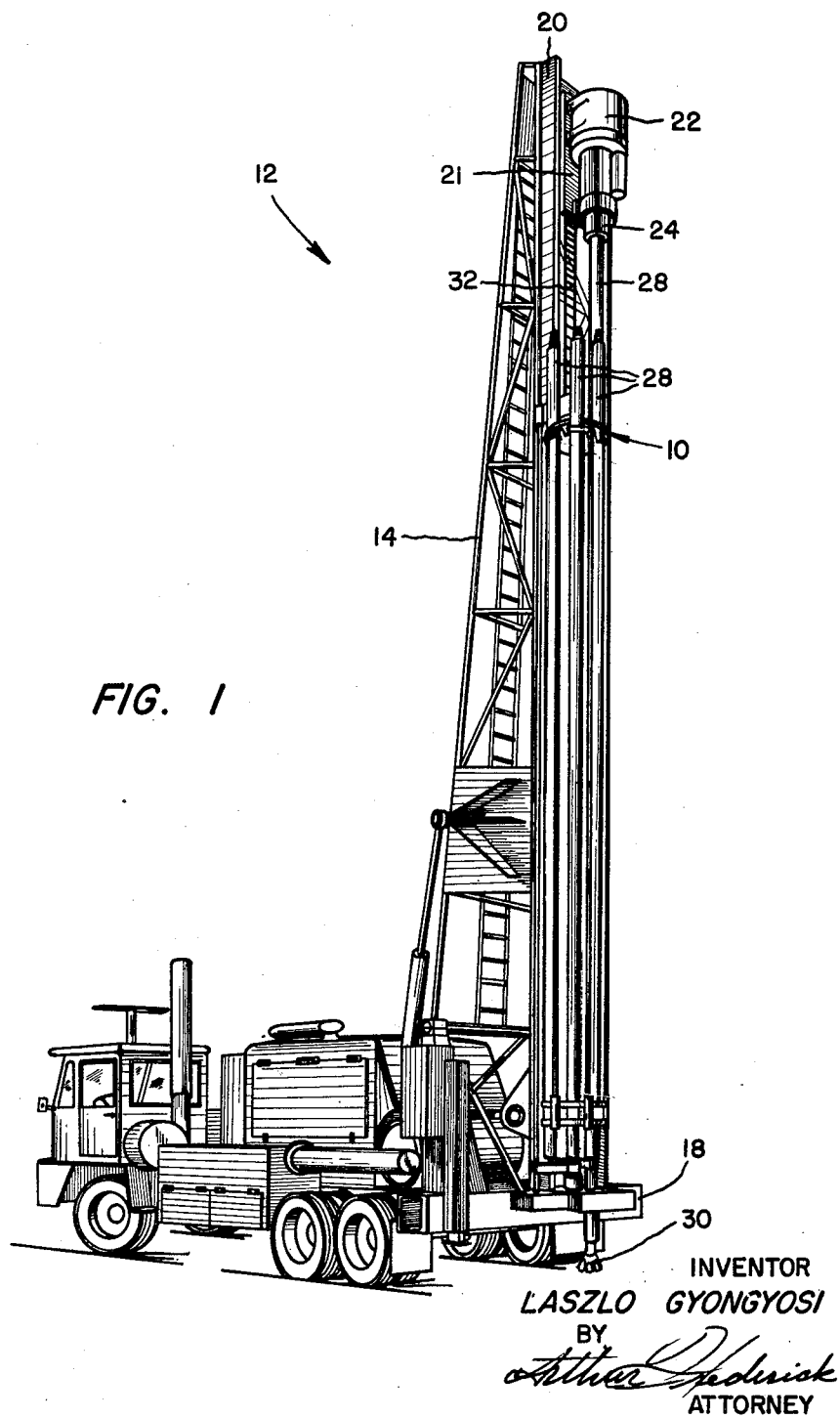

Nov. 17, 1964  L. GYONGYOSI  3,157,286
DRILL ROD STORAGE AND HANDLING MEANS
Filed March 20, 1963  6 Sheets-Sheet 1

INVENTOR
LASZLO GYONGYOSI
BY
ATTORNEY

INVENTOR
LASZLO GYONGYOSI
BY
ATTORNEY

INVENTOR
LASZLO GYONGYOSI

Nov. 17, 1964  L. GYONGYOSI  3,157,286
DRILL ROD STORAGE AND HANDLING MEANS
Filed March 20, 1963  6 Sheets-Sheet 6
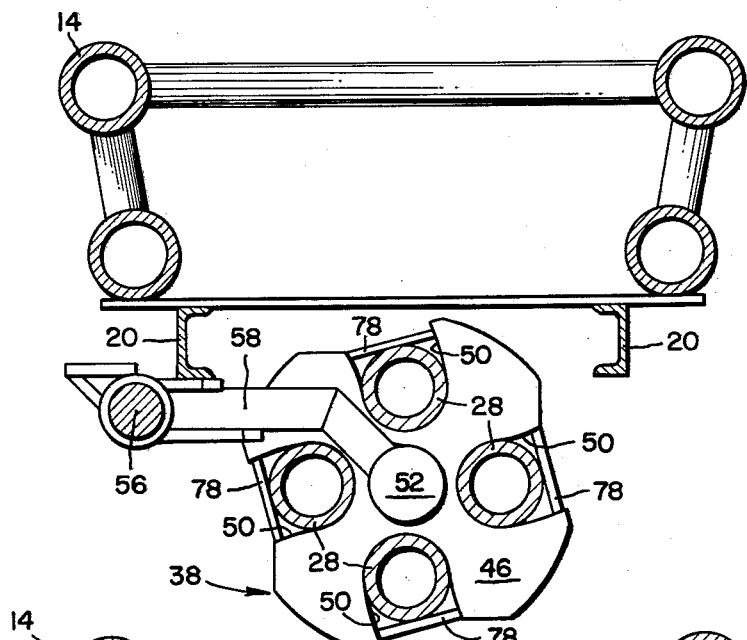
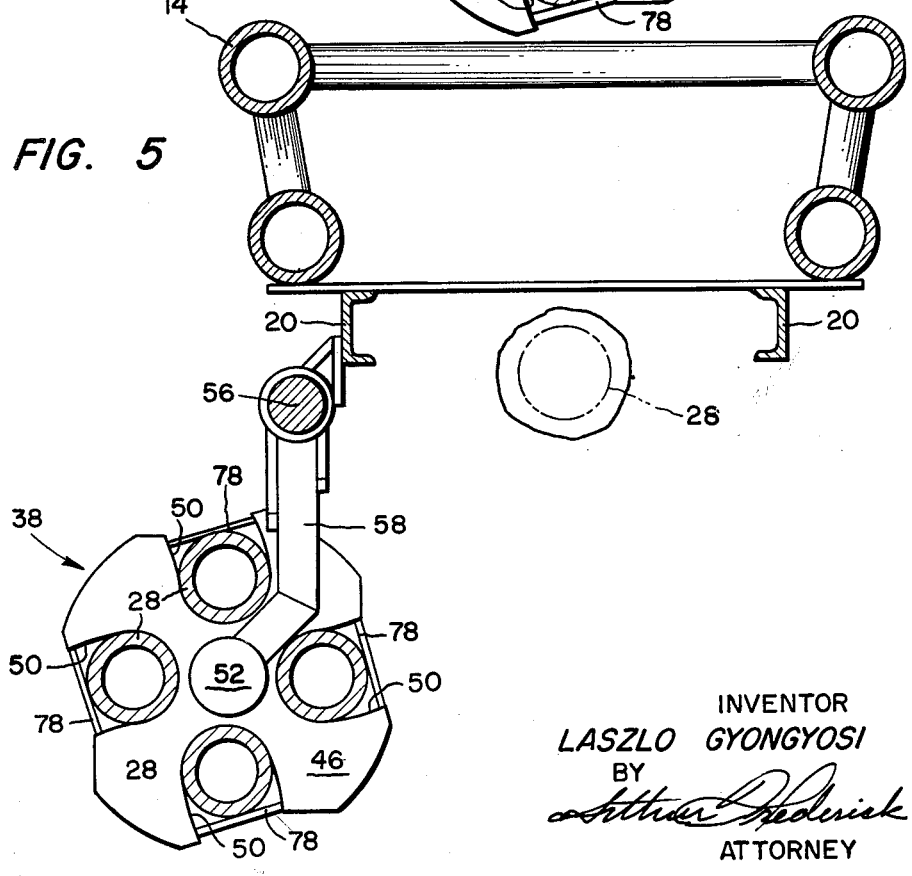
INVENTOR
LASZLO GYONGYOSI
BY
Arthur Frederick
ATTORNEY

United States Patent Office 3,157,286
Patented Nov. 17, 1964

3,157,286
DRILL ROD STORAGE AND HANDLING MEANS
Laszlo Gyongyosi, Easton, Pa., assignor to Ingersoll-Rand Company, New York, N.Y., a corporation of New Jersey
Filed Mar. 20, 1963, Ser. No. 266,603
5 Claims. (Cl. 211—1.5)

This invention relates to a storage and handling device and more in particular to a storage and handling device for rock drill pipes.

In rock drilling machines of the type for drilling vertical holes of substantial depth in which the drill string is accordingly of substantial length, manual operation for handling of the relatively long and heavily drill pipes to be added to or removed from the drill string is for commonly known reasons objectionable. Many arrangements have been tried to mechanize the aforementioned operations to provide apparatus for storage as well as handling the drill pipes. However, these apparatus are usually complicated and expensive to manufacture, in particular when required to operate fully automatic and remotely controlled.

It is then an object of the present invention to provide a storage and handling device for drill pipes of simple structure when compared to the commonly known types of storage and handling devices for drill pipes.

Other objects and advantages of the present invention will be in part pointed out and in part obvious hereinafter.

The invention will be more completely understood by reference to the following description and the drawing in which is shown a rock drilling apparatus equipped with a preferred embodiment of the storage and handling device according to the present invention.

Figure 2:
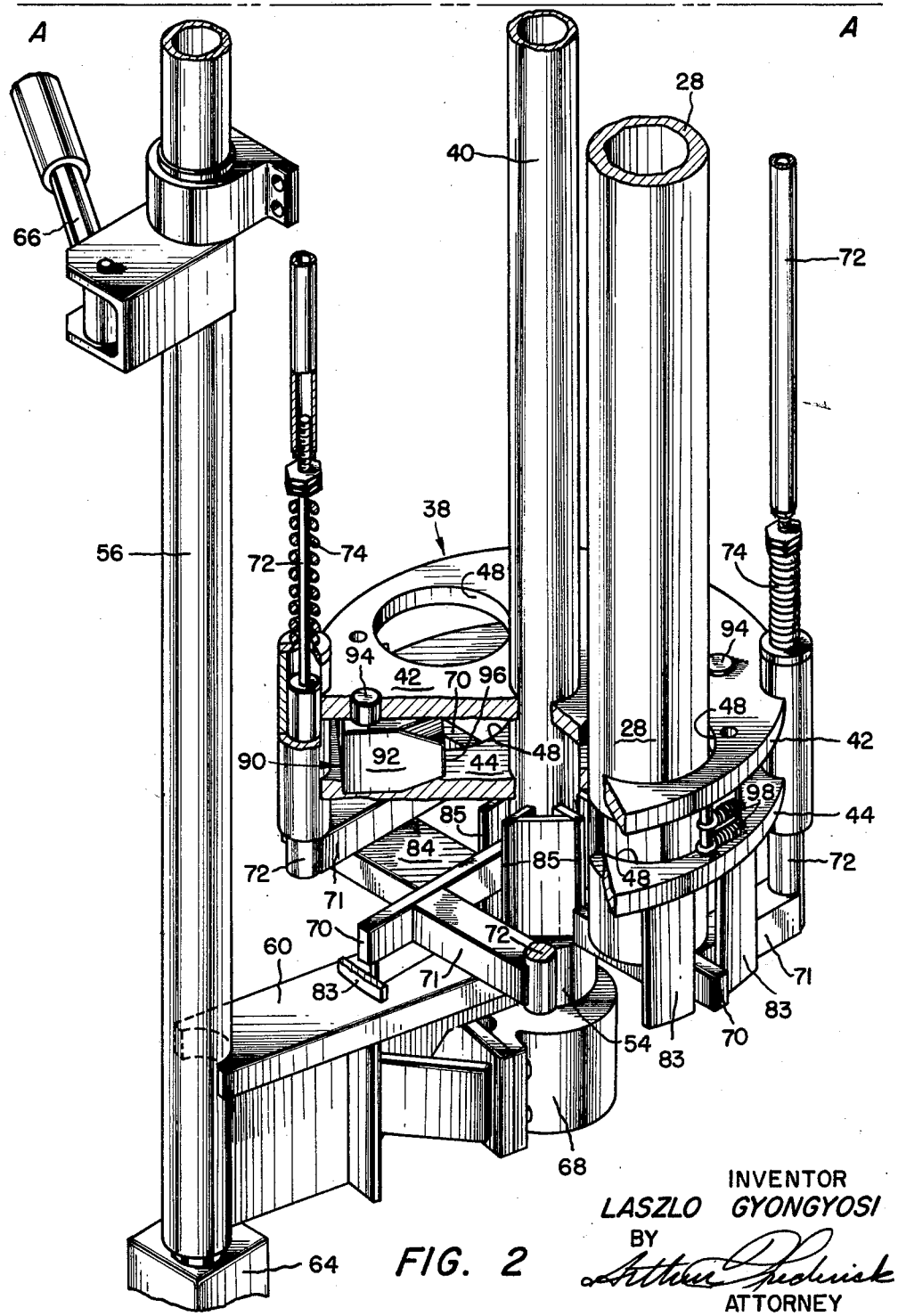
Figure 2A:
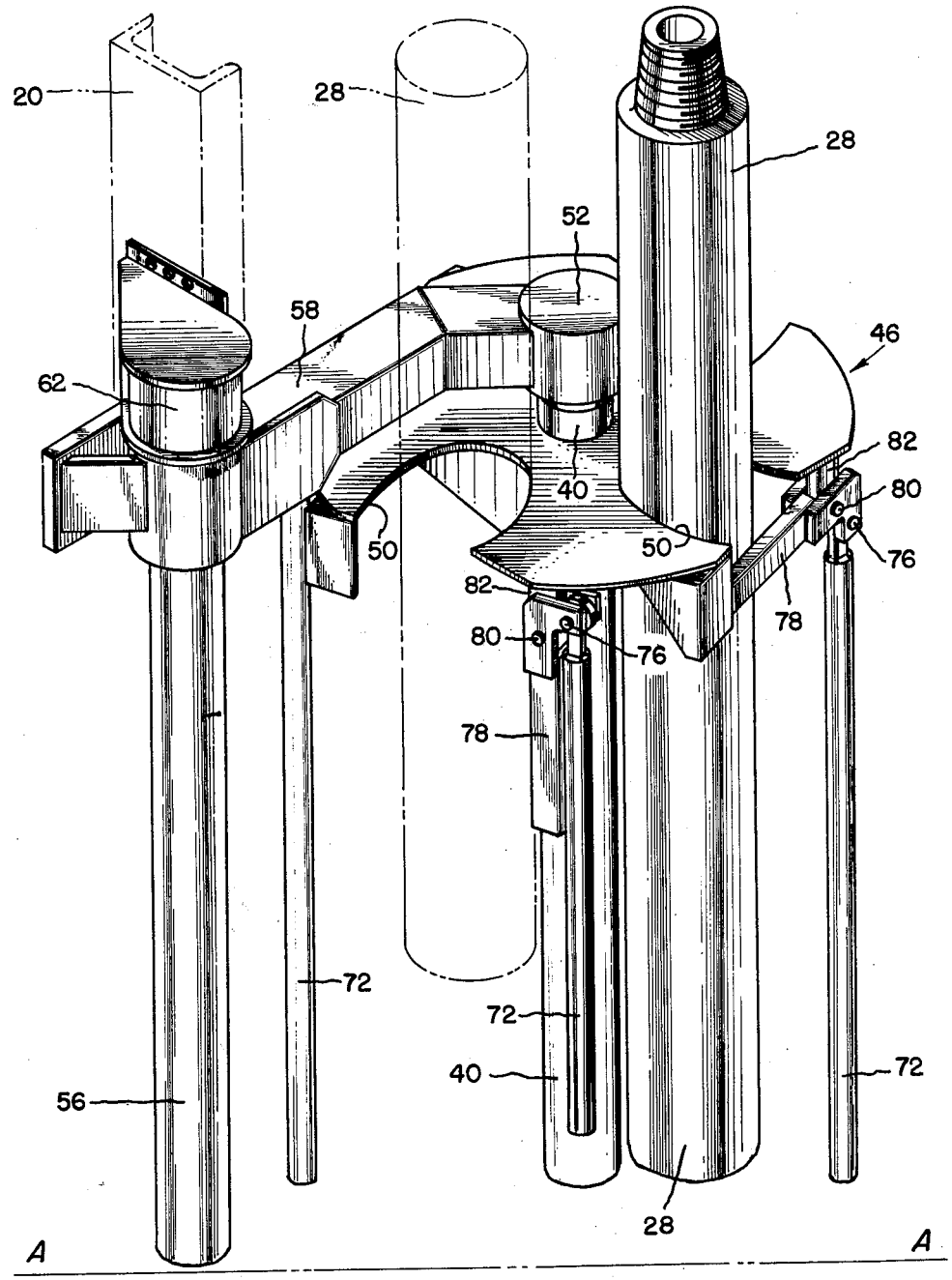
Figure 3:
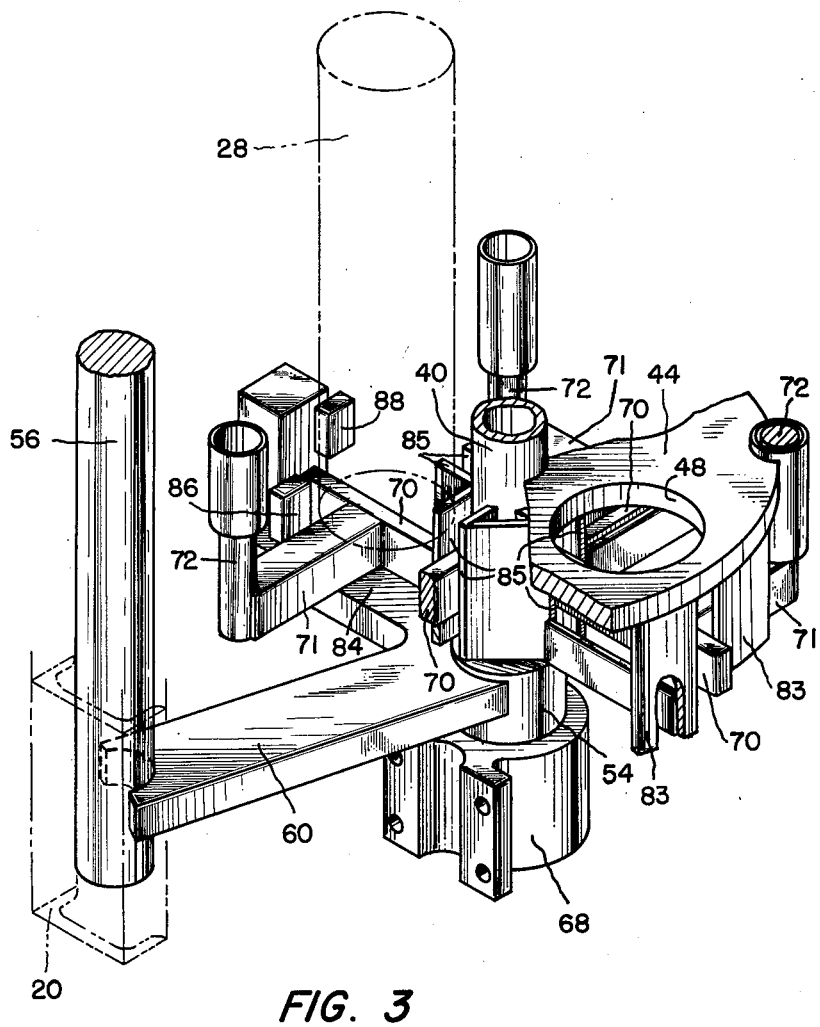
Figure 7:
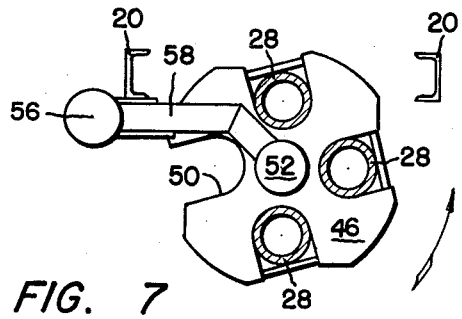
Figure 9:
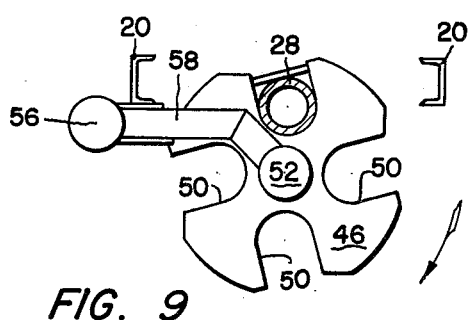
Figure 8:
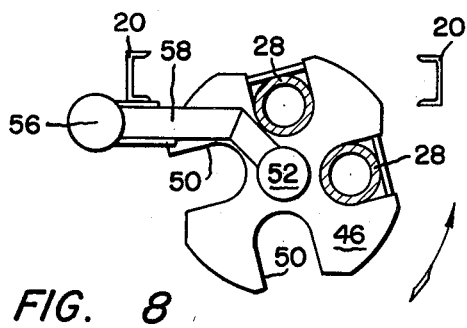
Figure 10:
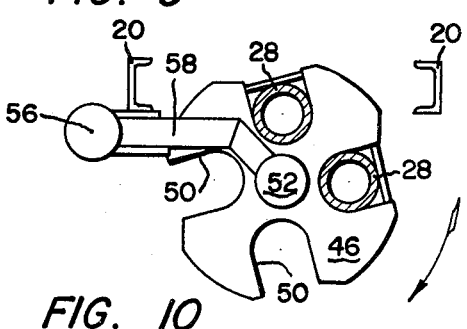
Figure 4:
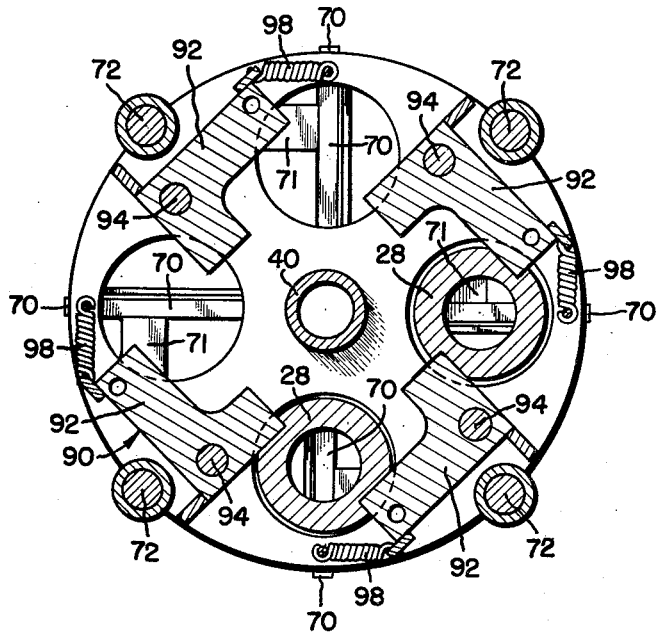

FIGURE 1 is a perspective view of a rock drilling apparatus equipped with a drill pipe storage and handling device according to the invention, FIGS. 2 and 2A are perspective views of the lower portion and the upper portion, respectively, of the drill pipe storage and handling device, parts of the device being omitted and parts broken away to more clearly illustrate the structural features of the device, FIG. 3 is a perspective view of the lower portion of the drill pipe storage and handling device with parts broken away to more clearly illustrate the indexing arrangement of the device, FIG. 4 shows the wrench arrangement of the drill pipe storage and handling device in cross sectional view, FIGS. 5 and 6 show diagrammatically the drill pipe storage and handling device in, respectively, a retracted or storage position, and in a position with a drill pipe in alignment with the drill hole, FIGS. 7 and 8 show diagramatically the sequence of unloading of the drill pipe storage and handling device for additional to the drill string, FIG. 7 showing the rack in a position with the first drill pipe removed from the rack and the second drill pipe in alignment with the drill hole to be added to the drill string, and FIG. 8 showing the rack in a position with the first and second drill pipes removed from the rack and the third drill pipe in alignment with the drill holes to be added to the drill string, and FIGS. 9 and 10 show diagramatically the sequence of loading of the drill pipe storage and handling device with drill pipes detached from the drill string, FIG. 9 showing the rack in a position with the first drill pipe in the rack after detachment from the drill string, and FIG. 10 showing the rack in a position with the second drill pipe in the rack after detachment from the drill string.

Referring to FIG. 1, the storage and handling device according to this invention is designated 10, and is shown in association with a commonly known type rock drilling apparatus designated 12. The rock drilling apprats comprises a drill tower 14 pivotally mounted on a support frame which is carried by a ground supported mobile base 18. Drill tower 14 is provided with a guide 20 along which a frame 21 having a drill motor 22 mounted thereon is guided for vertical movement. Drill motor 22, preferably of the pneumatic reversible type, is connected to drive a rotary head coupling 24 which in turn is connected to drive a drill string made up of a plurality of drill pipes 28, the forward end of which being connected to a drill bit 30. Frame 21 including drill motor 22 are lowered and raised in a commonly known manner along guide 20 by means of a sprocket chain 32 reeved over sprockets (not shown) and actuated by a feed motor (not shown) mounted on the drill tower.

The drill pipe storage and handling device 10, preferably for carrying four drill pipes 28, includes a rack 38, see FIG. 2, having a rotatable vertically positioned shaft 40 to which are connected horizontal base plates 42, 44, and a horizontal retainer 46, see FIG. 2A, axially displaced from each other. Shaft 40 is journaled at its upper end in a bearing 52, and at its lower end in a bearing 54. Base plates 42, 44 are connected to the lower end portion of shaft 40, axially spaced from each other, while retainer 46 is connected to the upper end portion of shaft 40, the base plates as well as the retainer provided with openings arranged in a circle about shaft 40 and evenly spaced from each other. The openings in base plates 42, 44, designated 48, are in axial alignment with each other to form sockets evenly spaced about shaft 40 to receive the lower end portion of the drill pipes, and are also in axial alignment with the openings in retainer 46, designated 50. Retainer 46 is provided with means to support the upper end portion of the drill pipes against radial movement while the lower end portion of the drill pipes extending through openings 48 of base plates 42, 44 are supported therein by means operatively associated with the means of retainer 46 as will be explained hereinafter. A rotary motor 68 is connected to the lower end of shaft 40 to rotate shaft 40, base plates 42, 44, and retainer 46 about the axis of shaft 40.

As shown in FIGS. 2 and 2A, rack 38 is swingable about a rotatable vertically positioned main shaft 56 and is connected thereto by means of an upper arm 58 and a lower arm 60. The inner ends of upper arm 58 and lower arm 60 are connected to, respectively, bearings 52 and 54 of shaft 40, while the outer ends of the arms 58 and 60 are connected to, respectively, the upper and lower end portions of main shaft 56. Main shaft 56 is journaled at its upper end in a bearing 62, and at is lower end in a bearing 64, both bearings being connected to the drill tower 14 of the rock drilling apparatus. Rotation of main shaft 56 is achieved by a commonly known type rectilinear hydraulic motor 66 (partly shown) having one end connected to rotate main shaft 56, and the other end connected to drill tower 14.

Rack 38 is rotatable by motor 68 about the axis of shaft 40, while the rack is swingable by motor 66 about the axis of main shaft 56, rotation of rack 38 being independently of swinging of rack 38 about the axis of shaft 56.

When rack 38 is loaded with drill pipes, each drill pipe is positioned with its lower end portion extending through axially spaced openings 48 of base plates 42, 44, and its upper end portion extending through the corresponding opening 50 of retainer 46. The lower end of each drill pipe engages a bar 70 positioned diametrically across and forwardly of each opening 48 of base plate 44. Bar 70 is rigidly connected to an arm 71 which in turn is connected to the lower end of a vertically positioned connecting rod 72 extending upwardly and supported by retainer 46. Connecting rod 72, constantly urged upwardly by a spring 74, is at its upper end pivotally connected at 76 to one end of a latch member 78 which in turn is pivotally mounted at 80 to a support 82, the latter being rigidly mounted on retainer 46.

When bar 70 is forced downwardly against the force of spring 74 by the weight of the drill pipe, connecting rod 72 is moved downwardly, causing latch member 78 to pivot upwardly into a horizontal locking position to lock the drill pipe in opening 50 of retainer 46, and to prevent the drill pipe from radial movement. When a drill pipe is raised from its loaded position in rack 38, the weight of the drill pipe is removed from bar 70, causing spring 74 to force connecting rod 72 upwardly and latch member 78 to pivot downwardly into a vertical unlocking position to permit radial movement of the drill pipe. It is to be noted that each bar 70, while restricted in its longitudinal movement by the connection to support 82 of retainer 46, is slidably held against sidewise movement by guide members 83, 85 positioned on either side of the end portions of bar 70 and rigidly connected to the lower face of base plate 44.

Thus, when a drill pipe is to be added to the drill string in the drill hole and four drill pipes are stored in rack 38, and rack 38 is in a retracted position away from the axis of the drill hole, main shaft 56 is actuated by motor 66 (partly shown) to swing rack 38 over the drill hole. The position of the rack is then such that one of the drill pipes on rack 38 is positioned in axial alignment with the rotary head coupling 24 of drill motor 22 and with the drill hole. Prior to swinging the rack over the drill hole, drill motor 22 has been raised, after being disconnected from the drill string in the drill hole, into a position higher than the upper ends of the drill pipes in the rack. The drill pipe in position over the drill hole is then connected to the rotary head coupling of drill motor 22 and raised clear of upper base plate 42 by the drill motor. Raising of the drill pipe causes bar 70, relieved from the weight of the drill pipe, and connecting rod 72 to be actuated upwardly by spring 74 to actuate latch member 78 into a vertical unlocking position. This permits the rack 38 to be swung away from the drill hole by motor 66 (partly shown), leaving the drill pipe suspended from the rotary head coupling of drill motor 22. The drill motor is then lowered to permit the drill pipe to be connected to the drill string in the drill hole in a commonly known manner.

In order to reposition the rack 38 each time after a drill pipe has been withdrawn from the rack to be added to the drill string in the drill hole, to provide for axial alignment of the next drill pipe with the drill hole when the rack is again swung towards the drill hole, indexing means is provided to cause rack 38 to rotate a predetermined distance, in this instance 90°, prior to or at the positioning of the rack over the drill hole, as will be apparent hereinafter. Such indexing means, see FIG. 3, includes a transverse arm 84 extending radially from bearing 54 and rigidly connected to lower arm 60 which connects bearing 54 of shaft 40 to main shaft 56. Transverse arm 84 is positioned forwardly of and diametrically across a set of openings 48 of base plates 42, 44, when rack 38 is swung into a position that the said set of openings 48 is axially aligned with the drill hole. Transverse arm 84 extends slightly beyond the outer periphery of base plates 42, 44, and is provided at its free end with a pair of stop members 86, 88, positioned in different planes on either side of the longitudinal axis of the transverse arm. Stop member 86, the lower member, is positioned in a plane corresponding to the plane of bar 70 when in its lowermost position carrying a drill pipe, while stop member 88, the upper member, is positioned in a plane corresponding to the plane of bar 70 when in its uppermost position relieved from the weight of the drill pipe, the purpose of the stop members to be explained hereinafter.

Referring to FIG. 4, rack 38 is provided with a wrench arrangement 90 comprising, in this instance where four drill pipes are carried by the rack, four retainer members 92 mounted evenly spaced about shaft 40 between base plates 42, 44. Each retainer member is pivotable about pin 94 and positioned to cooperate with each other to automatically engage cooperating notches 96 in the lower end portion of each drill pipe, each retainer member simultaneously locking two consecutive drill pipes against rotation in one direction. A spring 98 for each retainer member is provided to yieldably hold the retainer members in engagement with the notches of the drill pipes.

When a given drill pipe in rack 38 is to be withdrawn from the rack, it is to be connected to the rotary head coupling 24 of drill motor 22 by rotation of the rotary head coupling in a clockwise direction. The friction of the drill pipe on bar 70 and against the associated spring biased retainer members 92 is usually sufficient to hold the drill pipe against rotation when screwing the upper end of the drill pipe to the rotary head coupling. However, when a drill pipe, after disconnection from the drill string, is to be stored in the rack, it is disconnected from the rotary head coupling by rotation of the rotary head coupling in a counterclockwise direction. Since substantial force is required to achieve such disconnection the automatic wrench arrangement, as discussed hereinbefore, is provided to positively hold the associated drill pipe against rotation. It is to be noted that, with the wrench arrangement according to this invention, only four retainer members are required to simultaneously hold four drill pipes as well as each drill pipe separately against rotation, whereas with the commonly known types of wrenches each drill pipe is provided with an independently operating wrench usually having two opposing pawls, the entire wrench arrangement for four drill pipes requiring at least eight pawls or retainer members.

Assuming that rack 38 is fully stored and in a retracted position (see FIG. 5), and the first drill pipe of the ones in the rack is to be added to the drill string in the drill hole, motor 66 actuates main shaft 56 to swing the rack over the drill hole (see FIG. 6), positioning the selected drill pipe in axial alignment with the rotary head coupling of the drill motor and with the drill hole. Positioning or indexing of the rack to align the given drill pipe with the drill hole is achieved by cooperation of the bar 70 being forced down by the weight of the drill pipe, and the lower stop member 86 of transverse arm 84 positioned to be engaged by the bar 70 as the rack is being urged by motor 68 in a counterclockwise direction to hold bar 70 against lower stop member 86 (see FIG. 3). When the drill pipe, after being connected to the rotary head coupling of the drill motor, is raised by the drill motor, bar 70, being relieved from the weight of the drill pipe, is raised by spring 74 to actuate latch member 78 downwardly to permit withdrawal of the rack into a retracted position away from the drill hole, and connection of the drill pipe to the drill string in the drill hole.

Bar 70 of the first drill pipe being forced upwardly by spring 74 is positioned higher than the lower stop member 86 and out of engagement therewith, permitting the rack to be rotated 90° in a counterclockwise direction by motor 68 until bar 70 of the second drill pipe, being forced downwardly by the weight of the drill pipe, engages the lower stop member 86 to prevent actuation of the rack beyond stop member 86. When a second drill pipe of the ones in the rack is to be added to the drill string in the drill hole, motor 66 again swings rack 38 from a retracted position to a position over the drill hole (see FIG. 7). Either prior to or after the rack is swung over the drill hole, motor 68 rotates the rack 38 in a counterclockwise direction from a previous unloading position of the first drill pipe to a position of alignment of the second drill pipe with the drill hole. The third (see FIG. 8) and fourth drill pipes in the rack are indexed and added to the drill string in a manner as hereinbefore described in connection with the first and second drill pipes.

When the rack is empty and the four drill pipes, after being added to the drill string in the drill hole, are to be withdrawn from the drill hole and stored in the rack, the rack is swung over the drill hole to position one of the sets of openings 48 in axial alignment with the rotary head coupling of the drill motor to receive the drill pipe being held in suspension by the drill motor (see FIG. 9). In such a position bar 70 is in a raised position with the latch member 78 downwardly positioned to permit the drill pipe to be received in the rack. When the drill pipe is lowered and the lower end portion of the drill pipe extends through the openings 48 of base plates 42, 44, the weight of the drill pipe forces bar 70 downwardly and latch member 78 upwardly to lock the drill pipe in the rack. Downward movement of the bar moves the bar from a position adjacent upper stop member 88 to a position adjacent lower stop member 86 permitting rotation of the rack in a clockwise direction. The rack is then rotated 90° (clockwise) by motor 68 for reception of the second drill pipe until the associated bar, being in a raised position, engages the upper stop member 88 and positions the next set of openings 48 in axial alignment with the rotary head coupling of the drill motor (see FIG. 10). Operation of the rack for the reception of the third and fourth drill pipes is then repeated as hereinbefore explained in connection with the reception in the rack of the first and second drill pipes.

With the indexing arrangement as hereinbefore described, a simple means is provided for the rack to be automatically positioned for loading of a drill pipe detached from the drill string, or for unloading of a drill pipe to be added to the drill string in the drill hole. In addition thereto the indexing arrangement serves as a safety device for safeguarding the drill pipes, the drill pipe handling device as well as the drill tower against damage as a consequence of accidental rotation of the rack in a wrong direction when loading or unloading drill pipes. With the provision of the indexing arrangement as a safety means, drill pipes of substantially every length can be stored and handled by the rack independently of the distance between the base plates and the upper arm 58 supporting shaft 40 of the rack, as will be explained hereinafter. With presently used drill pipe storage and handling devices the length of drill pipes to be handled is determined by the distance between the base plates and the upper transverse arm supporting the rack shaft to permit the drill pipes to pass under the upper transverse arm, whereas the drill pipe storage and handling device according to this invention can store and handle drill pipes extending upwardly beyond the upper arm 58 of rack 38.

When the rack is fully stored and swung over the drill hole, see FIG. 6, the rack is automatically positioned for the removal of a drill pipe from the rack, there being no necessity for rotation of the rack. When a second drill pipe is to be removed from the rack, see FIG. 7, the rack is to be rotated to properly position the second drill pipe over the drill hole. If, however, motor 68 is accidentally operated to rotate the rack in a clockwise direction instead of in a counterclockwise direction, bar 70 being in a raised position relieved from the weight of the first drill pipe is blocked by upper stop member 88 to move clockwise, thereby preventing the rack from rotating in a clockwise direction. In this manner drill pipes extending upwardly beyond upper arm 58 of the rack can be used since the indexing arrangement prevents engagement of the drill pipes in storage in the rack with the upper arm 58, and consequent damage thereto.

When the rack is empty and swung over the drill hole the rack is automatically indexed to receive the first drill pipe detached from the drill string, see FIG. 9. When a second drill pipe is to be loaded into the rack, see FIG. 10, bar 70 associated with the first drill pipe being forced downwardly by the drill pipe, is permitted to rotate in a clockwise direction only, passing below upper stop member 88. Lower stop member 86 prevents rotation of the rack in a counterclockwise direction, thereby preventing engagement of the first drill pipe with upper arm 58 in case drill pipes extending upwardly beyond the upper arm 58 are used.

Since the indexing arrangement permits rotation of the rack from one loading or unloading position to the next loading or unloading position in one direction only, engagement with the upper arm 58 by the associated drill pipe, if extending upwardly beyond the upper arm 58, is prevented. It is then apparent that, since the lengths of the drill pipes to be stored and handled are independent of the distance between the upper arm 58 and the base plates of rack 38, the upper arm and the base plates of the rack can be positioned much closer to each other than heretofore practiced. Consequently, the associated shafts and other components can be made shorter, and the entire drill pipe storage and handling device can be manufactured more economically than the presently used drill pipe storage and handling devices.

While one embodiment of the present invention is shown and described in detail, it is to be understood that various changes and modifications may be made without departing from the spirit and scope of the invention as set forth in the appended claims.

I claim:
1. A drill pipe storing and handling device comprising:
   (a) a swingable support;
   (b) a rack for carrying a plurality of drill pipes mounted on said support to rotate about the axis of said rack independently of swinging of said support;
   (c) locking means mounted on said rack and actuable by the weight of a drill pipe when said drill pipe is carried by said rack to lock said drill pipe in said rack;
   (d) means for rotating said rack about its axis; and
   (e) indexing means mounted on said support and cooperating with said locking means to limit rotation of said rack in one direction to a predetermined portion of a turn, in response to the weight of a pipe in said rack, by stopping the rotation of said rack at a point wherein said pipe is properly positioned for being removed from the rack and used in a drill operation.

2. A drill pipe storing and handling device as defined in claim 1 wherein: said indexing means is operative in response to removal of the weight of said drill pipe from said rack to stop the rotation of said rack in the opposite direction of rotation from said one direction whereby said rack is properly positioned by said indexing means for the return of a drill pipe to said rack.

3. The device claimed in claim 2 in which said indexing means to limit rotation of said rack includes:
   (a) a first stop member mounted on said support in a first plane to be engaged by said locking means when said locking means is rotated with said rack and moved to a position locking said drill pipe in said rack, said first stop member serving to limit said rack to rotation through a predetermined portion of a turn in said one direction of rotation during the removal of a pipe from the rack; and
   (b) a second stop member mounted on said support in a second plane to be engaged by said locking means when said locking means is rotated with said rack and moved to a position unlocking said drill pipe in said rack, said second stop member serving to limit the rotation of said rack to a predetermined portion of a turn in the opposite direction of rotation from said one direction of rotation, during the restorage of a pipe on said rack.

4. A drill pipe storing and handling device comprising:
   (a) a swingable support;
   (b) a rack for carrying a plurality of drill pipes mounted on said support to rotate about the axis of said rack independently of swinging of said support;
   (c) locking means mounted on said rack and actuable by the weight of a drill pipe when said drill pipe is carried by said rack to lock said drill pipe in said rack;

(d) means for rotating said rack about its axis; and (e) indexing means mounted on said support and cooperating with said locking means to limit rotation of said rack in one direction to a predetermined portion of a turn, in response to the weight of a pipe in said rack, by stopping the rotation of said rack at a point wherein said pipe is properly positioned for being removed from the rack and used in a drill operation, said indexing means being operative to automatically release said rack in response to the removal of the weight of said pipe from said rack so that said rack is free to rotate further until another drill pipe in said rack is properly positioned for removal from the rack.

5. A drill pipe storing and handling device comprising:

(a) a swingable support;

(b) a rack for carrying a plurality of drill pipes mounted on said support to rotate about the axis of said rack independently of swinging of said support;

(c) locking means mounted on said rack and actuable by the weight of a drill pipe when said drill pipe is carried by said rack to lock said drill pipe in said rack;

(d) means for rotating said rack about its axis;

(e) indexing means mounted on said support and cooperating with said locking means to limit rotation of said rack in one direction to a predetermined portion of a turn, in response to the weight of a pipe in said rack, by stopping the rotation of said rack at a point wherein said pipe is properly positioned for being removed from the rack and used in a drill operation, said indexing means being operative to automatically release said rack in response to the removal of the weight of said pipe from said rack so that said rack is free to rotate further until another drill pipe in said rack is properly positioned for removal from the rack; and (f) a pawl pivotedly mounted on said rack between two adjacent drill pipes for simultaneously engaging cooperating notches in said two drill pipes and holding said two drill pipes against rotation in one direction.

References Cited in the file of this patent

UNITED STATES PATENTS

| | | |
|---|---|---|
| 2,781,185 | Robbins | Feb. 12, 1957 |
| 2,909,288 | Boudette | Oct. 20, 1959 |
| 2,972,388 | Thornburg | Feb. 21, 1961 |
| 3,025,918 | Leven | Mar. 20, 1962 |